United States Patent Office 3,537,915
Patented Nov. 3, 1970

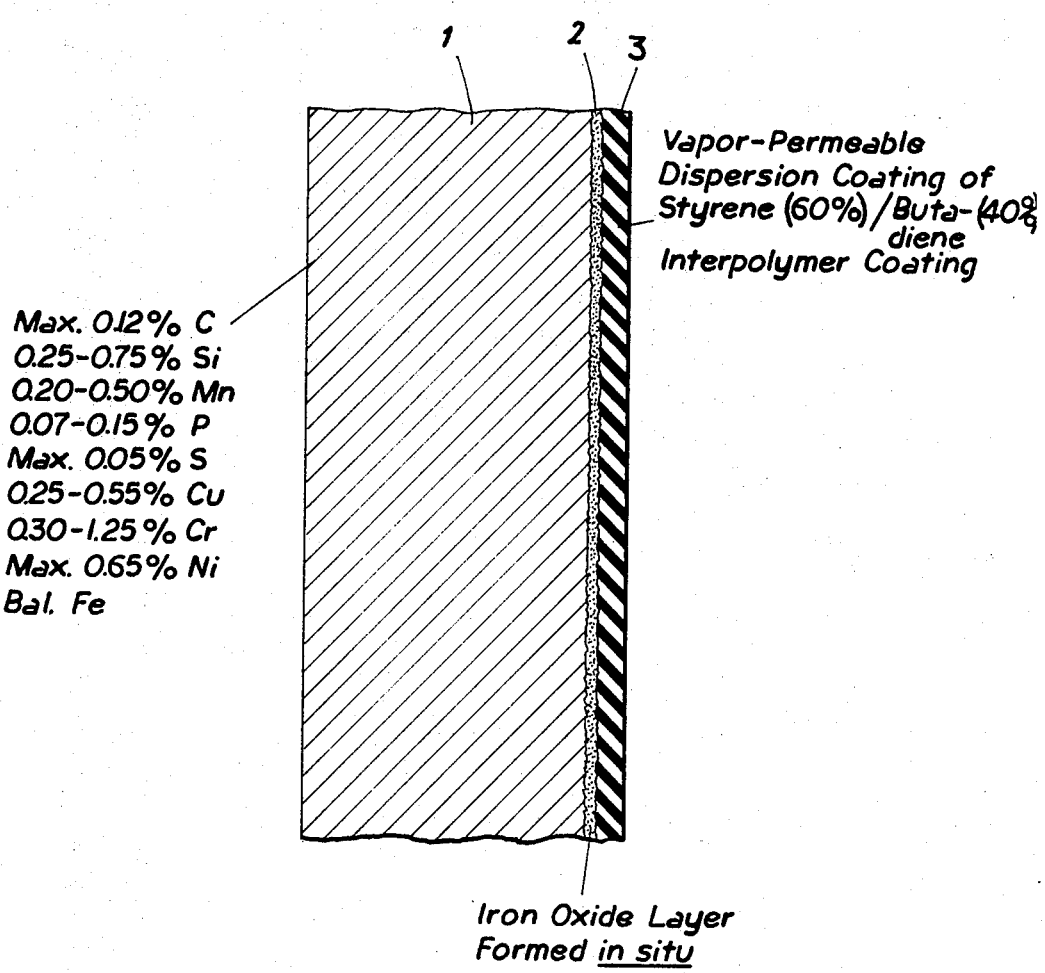

1

3,537,915
STRUCTURAL STEEL MEMBERS AND METHOD
OF MAKING SAME
Gerhard Becker, Essen-Frintrop, Germany, assignor to
Huttenwerk Oberhausen A.G., Oberhausen, Rhineland,
Germany, a corporation of Germany
Filed Apr. 18, 1968, Ser. No. 722,391
Claims priority, application Germany, Apr. 20, 1967,
H 62,494
Int. Cl. C23f 7/04, 5/00
U.S. Cl. 148—6.35         7 Claims

ABSTRACT OF THE DISCLOSURE

A process for producing structural steel members, e.g., steel sheets and profiles such as I-beams, H-beams and angle members, which consist of a rusting steel coated with a synthetic-resin surfacing layer of an interpolymer of butadiene and styrene, the steel being of the weather-resistant type and having generally the following composition: trace amounts to 0.12% carbon, 0.25 to 0.75% silicon, 0.20% to 0.50% manganese, 0.07% to 0.15% phosphorus, trace amounts to 0.05% sulphur, 0.25% to 0.55% copper, 0.30 to 1.25% chromium, trace amounts to 0.65% nickel, and the balance iron. The interpolymer or mixed polymer of styrene and butadiene contains about 60% styrene and 40% butadiene with a specific gravity of about 1.01. The polymeric material is applied to the steel body as a vapor-penetrable layer and the coated surface is weathered to form an oxide layer at the interface between the steel body and the polymeric layer.

My present invention relates to structural steel members and a method of making same.

In my copending application Ser. No. 568,146 filed July 26, 1966, now Pat. No. 3,479,299, I have pointed out that it is possible to treat lightly alloyed steel bodies, which have a composition such that they are not rust-free, to improve the surface characteristics thereof by preventing deteriorating corrosion and in order to render the steel members weather-resistant and suitable for use in exposure to the atmosphere as panels, profiles or the like in the above-surface structures. As noted out there, prior use of steel panels (sheet steel) or steel profiles (e.g. beams, girders and columns) has been such as to require the steel members to be completely concealed or encased because of their tendency to corrosion, the unaesthetic nature of atmospheric corrosion and the inability to protect the steel surfaces permanently by painting or the like. An alternative technique has been to use rust-resistant, high-alloyed or high-quality austenitic steels which, however, are impractical in most structural applications because of their cost. Thus, although steel-structural members are commonly employed in buildings because of their great strength, it has been the prevalant practice to encase the structural members in concrete or to mount panels upon them. In modifications of this approach, a steel member may be coated with a corrosion-resistant appearance-improving layer of other metals (e.g., stainless steel, aluminum alloys) such that the cladded steel member can be exposed to the atmosphere and the view of the public. Also, as pointed out in that application, such systems are not always suitable and also involve increased fabrication costs.

It has, therefore, long been sought in the construction and metallurgical field to provide a steel structural member whose surfaces are able to weather corrosive environments and atmospheres and which are reasonably pleasing in appearance.

It has been discovered, that certain types of steels are capable of rusting or oxidizing relatively uniformly under such conditions and that the oxidized layer resists further corrosion. These members have not found widespread use since the oxidized layer, at least initially, has a tendency to stain adjoining nonmetallic surfaces as moisture and condensates carry part of the freshly developed, highly colored oxides onto these adjoining surfaces. Where used, the members are not provided with a protective coating so that, upon exposure to the atmosphere, the self-protective oxide layer, which resists further corrosion, is formed as an oxide patina. Steels of this type generally includes corrosion-resistant components, such as copper, nickel, chromium, vanadium and phosphorus, individually or in combination and making up, at most, 2% by weight of the alloy. Such steels do not, however, ensure a satisfactory long-term bond of the oxide layer to the nonoxidized steel structure underlying same and, indeed, the oxide layer of these members approximates the loose oxides formed on common steel and iron bodies with a tendency to flake and stain. Only after prolonged exposure to the atmosphere is the oxide film built up to a sufficient thickness to prevent further deterioration of the steel body. The staining of the adjoining surfaces is also a characteristic of such members which have a mottled appearance with weathering.

Accordingly, in the system described in my copending application, steel bodies containing small quantities of alloying ingredients are treated with a prerusting solution (prior to incorporation in the structure) to form an initial oxide layer strongly bonded to the underlying metal and free from the tendency to loosen under atmospheric exposure but capable of oxidizing further to produce a dense protective oxide layer. Bodies of this nature can be used as panels or the like in building structures and to encase or conceal the structural members of substantially any above-surface structure or even to constitute the structural member (exposed to the atmosphere and view by passersby).

The initial oxide structure is stabilized by depositing thereon a water-impermeable but vapor-penetrable layer of a film-forming composition. When the term "waterproof" is used hereinafter to refer to the protective coating on the weather-resistant steels, it is to be understood that the stabilizing layer bars penetration by liquid water but may permit penetration by diffusion of water vapor and moist air through the stabilizing composition. The prerusting solution comprises a water-soluble iron salt convertible into an iron oxide upon treatment of the metal surface therewith and at least one heavy metal sulfate adopted to form basic-sulfate compounds upon exposure to the atmosphere, these compounds being scarcely soluble in water. The film-forming layer consists preferably of at least one film-forming substance selected from the group which consists of natural or synthetic resins, waxes, cellulosic film formers, rubber and other elastomeric derivatives, film-forming silicates or the like used together, or individually, or in any combination. While various steel alloys can serve as the treated substrate, it has been found that best results are obtainable when the lightly-alloyed steel contains less than 2% by weight of copper, nickel, chromium, vanadium, molybdenum and phosphorus, individually and in combination; the alloy should, however, contain at least 0.25% by weight of copper and at least 0.30% by weight of chromium. A suitable composition for these purposes consists essentially of:

| | Percentage by weight |
|---|---|
| Carbon | trace amounts to 0.12 |
| Silicon | 0.25 to 0.75 |
| Manganese | 0.20 to 0.50 |
| Phosphorus | 0.07 to 0.15 |
| Sulfate | trace amounts to 0.05 |
| Copper | 0.20 to 0.55 |
| Chromium | 0.30 to 1.25 |
| Nickel | trace amounts to 0.65 |

Balance: iron.

The expression "trace amounts" is used herein to indicate the presence of about 0.01% by weight of the indicated substance.

As pointed out in the aforementioned copending application, the prerusting solution may also include a viscosity modifier (e.g., glycerin) adapted to ensure a smooth and uniform coating of the prerusting solution onto the steel beam, a wetting agent (preferably a fatty acid condensate with methyl taurine) to promote intimate contact between the treating solution and the metal, and a volaile water-missible vehicle (e.g., alcohol) adapted to evaporate after the metal surface has been coated with the solution to facilitate drying. The solution also contains a component (e.g., oxalic acid) designed to promote the formation of fine-grained iron oxide upon the metal surface with drying of the treatment liquid. A typical prerusting solution of the type described in the aforementioned application comprises an aqueous solution of iron nitrate, copper sulfate, nickel sulfate, glycerin and oxalic acid. The stabilizing coating for the initial oxide layer may be composed of a film former of the elastomeric type (usually a cyclocaoutchouc or India rubber) a solvent for the elastomeric component (e.g., carbon tetrachloride), a shedding component (e.g., an Aerosil colloidal silica), a pigment component (e.g., iron oxide hydrate) and a high-molecular weight alcohol.

It is the principal object of the present invention to develop further aspects disclosed in the aforementioned copending application and to provide structural steel members of lower cost, higher quality, more aesthetic appearance and greater weathering capabilities than has been possible heretofore.

It has now been found that the expense of prerusting the metallic surface and thereafter coating it with a film-forming substance as indicated above can be avoided by forming, on the metallic surface of a rustable steel preferably of the composition set forth earlier, an interpolymer coating of butadiene and styrene. The interpolymer or copolymer preferably is deposited in the form of a dispersion of a latex of the styrene/butadiene type (e.g., Butaprene PL, Butaprene S) or other conventional GR-S butadiene styrene interpolymer or copolymer latex containing 60% by weight styrene and 40% by weight butadiene with a specific gravity of about 1.01. When the latex is applied in the form of a dispersion to the metal body, it forms an elastomeric film which bonds effectively to the substrate and is liquid-impenetrable but permeable to water vapor, thereby allowing an in-situ formation of the oxide patina at the interface between the film-forming layer and the substrate. The surface coating may have its appearance modified by the addition thereto of mica powder, asbestos fibers and talc, which also serve to modify the vapor permeability of the layer and may be added in an amount ranging between 5 and 25% by weight of the film-forming layer. The elastomeric material is present preferably in an amount ranging between 10 and 30% by weight of the film-forming material and, as in the system of the prior application, a pigment may also be added. Preferably, the pigment is of the iron-oxide type (e.g., iron oxidehydrate) which may be used in an amount ranging between 1 and 20% by weight of the film-forming layer.

It has surprisingly been found that an interpolymer-based layer in which the styrene (55 to 65% by weight, preferably 60%) and the butadiene (35 to 45% by weight, preferably 40%) is combined with finely divided iron-oxide pigments, rust stabilizing components such as copper and nickel salts or phosphates and chromates, are satisfactorily bound to the metal surface but nevertheless permit an underlying oxidation without requiring the initial oxidation treatment and without the requirements that plasticizers be added to the layer; it appears that the butadiene component provides an intrinsic plasticizing. When plasticizers are used, the vapor penetrability of the layer is substantially reduced, thereby reducing the possibility that proper oxidation will occur at the interface. When oxide-layer stabilizers are employed, I prefer that they be present in an amount less than 5% by weight of the film-forming layer and that they consist of copper- and nickel-containing salts, especially phosphates and chromates, individually or in combination. Precipitating salts such as barium, calcium and strontium nitrates may be added to the coating composition to precipitate out insoluble sulfates and render the oxide stabilizers more effective.

According to another aspect of this invention, the gas-breathing, elastic and tenacious film is substantially unaffected by the developing underlying rust layer. During the coating of the workpiece with the protective film, only traces of water are employed, not as rusting agent but merely as a hydrating agent for the iron-oxide pigment. There is substantially no initial oxide formation, and only after a number of years is the intervening layer of oxide formed. During this period, the coating layer is oxidatively eroded and finally is totally destroyed to leave a permanent and nonrunning oxide layer.

The above and other objects, features and advantages of the present invention will become more readily apparent from the following description, reference being made to the accompanying drawing and specific examples. In the drawing, the sole figure is an enlarged diagrammatic cross-sectional view of a steel plate provided with the coating of the present invention.

EXAMPLE I

A steel sheet serves as the substrate and has substantially the following composition:

| | Percentage by weight |
|---|---|
| Carbon | 0.10 |
| Silicon | 0.35 |
| Manganese | 0.40 |
| Phosphorus | 0.08 |
| Sulphur | 0.03 |
| Copper | 0.28 |
| Chromium | 0.50 |
| Nickel | 0.40 |

Balance: iron.

The steel plate is used as a decorative and protective panel on the facade of a building and may have a thickness of about 0.7 mm. laminated to a further substrate.

The surface is degreased and sprayed with a protective layer of the following composition:

| | Percent |
|---|---|
| Elastomeric latex solids containing 60% styrene and 40% butadiene as interpolymer or copolymer [1] | 21.6 |
| Filler (6.5% talc and 12.5% asbestos fibers) | 19 |
| Iron-oxide pigment | 10.15 |
| Antifoaming agent (ethyloleate) | 0.2 |
| Antisettling agent | 0.1 |
| Calcium nitrate | 0.3 |
| Copper nitrate | 0.2 |
| Nickel phosphate | 0.2 |
| Potassium nickel chromate | 0.4 |
| Balance: water and 5% ammonia. | |

[1] Butaprene PL latex, Butaprene S solids (suspended), or butadiene styrene copolymers as described in British patent specification 841,889, published July 20, 1960.

The layers deposited on the metal substrate have a thickness of 15 to 20 microns. Originally, the protective layer 3 (see the drawing) was in direct contact with the surface of the substrate 1. Upon exposure to the atmosphere for a 12-month period, a 20 to 30 micron layer 2 of oxide patina developed at the interface and was covered by the vapor-permeable film 3. The thickness of film 3 has descreased by oxidative erosion to about 5 to 7 microns.

EXAMPLE II

A cold-rolled steel sheet with a thickness of 0.8 mm. laminated to an underlying layer and of the following composition was used as a substrate:

| | Percent |
|---|---|
| Carbon | 0.09 |
| Silicon | 0.37 |
| Manganese | 0.43 |
| Phosphorus | 0.088 |
| Sulphur | 0.23 |
| Aluminum | 0.03 |
| Copper | 0.40 |
| Chromium | 0.42 |
| Nickel | 0.38 |
| Balance: iron. | |

The trapezoidal sheet was covered along its surface with a light layer of fly rust which was removed to the extent that it was lost by a compressed-air blast at 5 atmospheres (gauge). The composition of Example I was deposited upon the surface. After the initial coating deposited a layer of 10 to 15 microns, a second coating was applied for a total layer thickness of 30 microns. The coated sheet could be handled without distortion of the layer, or its rupture. Rust formation and film disintegration occurred at the rate described in connection with Example I.

I claim:
1. A method of preparing a steel facing for structures and the like, comprising the steps of coating at least one surface of a rustable steel body with a vapor-penetrable polymeric layer of a styrene butadiene composition; and weathering the coated surface to form an oxide layer at the interface between said polymeric layer and said body.

2. The method defined in claim 1 wherein said steel body has substantially the following composition:

| | Percentage by weight |
|---|---|
| Carbon | trace amounts to 0.12 |
| Silicon | 0.25 to 0.75 |
| Manganese | 0.20 to 0.50 |
| Phosphorus | 0.07 to 0.15 |
| Sulphur | trace amounts to 0.05 |
| Copper | 0.25 to 0.55 |
| Chromium | 0.30 to 1.25 |
| Nickel | trace amounts to 0.65 |
| Balance: iron | |

3. The method defined in claim 2 wherein said polymeric layer is formed by a dispersion of interpolymerized butadiene and styrene.

4. The method defined in claim 3 wherein the interpolymerized butadiene and styrene comprise substantially 55 to 65% by weight styrene and 35 to 45% by weight butadiene.

5. The method defined in claim 4 wherein the interpolymerized butadiene and styrene consist essentially of 60% by weight styrene and 40% by weight butadiene with a specific gravity of about 1.01.

6. The method defined in claim 1 wherein said polymeric layer further comprises substantially 5 to 25% by weight of a filler selected from the group which consists of mica powder, asbestos fibers and talc, between 20% by weight iron oxide pigment and at least one rust-stabilizing compound selected from the group which consists of copper- and nickel-containing salts, phosphates and chromates.

7. The method defined in claim 1 wherein the polymeric layer deposited upon said surface has substantially the following composition:

| | Percent |
|---|---|
| Eleastomeric latex solids containing 60% styrene and 40% butadiene in interpolymer or copolymer | 21.6 |
| Talc and 12.5% asbestos fibers | 6.5 |
| Iron-oxide pigment | 10.15 |
| Antifoaming agent | 0.2 |
| Antisettling agent | 0.1 |
| Calcium nitrate | 0.3 |
| Copper nitrate | 0.2 |
| Nickel phosphate | 0.2 |
| Potassium nickel chromate | 0.4 |
| Balance: water and 5% ammonia. | |

References Cited

UNITED STATES PATENTS

| 3,479,229 | 10/1969 | Becker | 148—6.24 |
| 3,013,926 | 12/1961 | Railsback | 117—132 |

ALFRED L. LEAVITT, Primary Examiner

M. F. ESPOSITO, Assistant Examiner

U.S. Cl X.R.

117—75, 79, 132